United States Patent [19]
Colby

[11] 4,389,177
[45] Jun. 21, 1983

[54] MODULAR SLUSH MOLDING MACHINE

[75] Inventor: Daniel E. Colby, Somersworth, N.H.

[73] Assignee: McCord Corporation, Detroit, Mich.

[21] Appl. No.: 264,014

[22] Filed: May 15, 1981

Related U.S. Application Data

[60] Division of Ser. No. 56,866, Jul. 12, 1979, Pat. No. 4,331,626, which is a division of Ser. No. 832,640, Sep. 12, 1977, Pat. No. 4,217,325, which is a continuation-in-part of Ser. No. 789,410, Apr. 21, 1977, abandoned.

[51] Int. Cl.³ .................. B29C 5/04; B29C 1/00; B29C 5/12
[52] U.S. Cl. ...................................... 425/144; 425/435
[58] Field of Search ............... 425/120, 130, 144, 428, 425/429, 435, 384, 378; 264/310, 311, 327

[56] References Cited

U.S. PATENT DOCUMENTS

| | | | |
|---|---|---|---|
| 2,651,586 | 9/1953 | Cooper et al. | 264/DIG. 60 |
| 3,173,175 | 3/1965 | Lemelson | 425/435 |
| 3,315,016 | 4/1967 | Wersosky et al. | 264/337 |
| 3,454,988 | 7/1969 | Cremer | 425/435 |
| 3,574,245 | 4/1971 | Dohm | 425/435 |
| 3,728,429 | 4/1973 | Colby et al. | 264/DIG. 60 |
| 3,754,852 | 8/1973 | Rempel | 425/435 |
| 3,763,293 | 10/1973 | Nussbaum | 264/327 |
| 3,824,061 | 7/1974 | Giehler | 264/310 |
| 3,891,370 | 6/1975 | Giehler | 425/144 |
| 4,257,755 | 3/1981 | Lemelson | 264/327 |

FOREIGN PATENT DOCUMENTS 865608 4/1961 United Kingdom ............... 264/302

*Primary Examiner*—Willard E. Hoag
*Attorney, Agent, or Firm*—McGlynn and Milton

[57] ABSTRACT

A method and an assembly for practicing that method wherein an article is molded of a heat-fusing material or plastisol in a mold having first and second groups of liquid passages disposed adjacent the mold surface for controlling the temperature over respective first and second areas of the mold surface. The mold is supported for rotation about an axis by a stationary pedestal. A movable module supports plastisol storage tanks, heat exchangers, valves, conduits, etc., for supplying the plastisol to the mold. The movable module also supports a dump tank which is disposed beneath the mold for receiving and retrieving the liquid plastisol which is emptied or dumped from the mold when it is rotated to an inverted position. There is included first and second liquid circuits including a pump and heat exchanger for supplying liquid at different temperatures to the passages associated with the mold. All of the passages are supplied with heated liquid to maintain the temperature of the first and second areas of the mold surface at a non-gelling temperature and a liquid plastisol coating is applied to the mold surface.

2 Claims, 4 Drawing Figures

MODULAR SLUSH MOLDING MACHINE

RELATED APPLICATION

This application is a divisional of application Ser. No. 56,866, filed July 12, 1979, which is now U.S. Pat. No. 4,331,626, and which is a divisional of application Ser. No. 832,640 filed Sept. 12, 1977, now U.S. Pat. No. 4,217,325, and which is a continuation-in-part of application Ser. No. 789,410 filed Apr. 21, 1977, now abandoned.

BACKGROUND OF INVENTION

1. Field of Invention

This invention relates to a method and an assembly for practicing the method of molding hollow thin-walled articles from a heat-fusing material such as vinyl plastisol by slush molding.

Various vinyl plastisol compositions are known and used in various slush molding methods in various assemblies for performing those methods. Typically, an open hollow mold is filled with liquid plastisol and heat is applied to the mold surface and transferred to the liquid plastisol to gell a layer of plastisol adjacent the mold surface. The thickness of the gelled layer depends upon the temperature to which the plastisol layer is subjected and the time the plastisol is maintained at that temperature. After the layer adjacent the mold surface is gelled, the ungelled liquid plastisol remaining is dumped or poured out of the mold.

2. Description of the Prior Art

In one well-known method, the mold temperature is maintained relatively low to prevent gelling as a very thin initial layer or coating of plastisol is applied to the mold to prevent bare spots and to prevent the entrapment of air bubbles, thereby providing a thin coating which strictly conforms to the mold configuration. Such a coating is applied by filling and emptying the mold. For example, automotive dashboard or instrument panel covers are made in this fashion and the molds frequently include details to define imitation stitching in the finished product as well as undercuts and other intricate detail. The very thin coating is first applied to conform to the mold and to prevent irregularities in the outer surface of the finished product. After this very thin coating is applied, the mold is again filled with additional plastisol and the entire mold is heated to gel the plastisol and increase the thickness of the finished product. After the desired thickness is attained, the mold is again dumped or emptied and thereafter the mold is subjected to additional heat for curing the product.

An example of such a method and an assembly for practicing same is shown in the U.S. Pat. No. 3,728,429 granted to Daniel E. Colby, Philip E. Rogers and Frederick J. Sliwinski on Apr. 17, 1973 and assigned to the assignee of the subject invention. That patent discloses such a method for slush molding articles wherein the mold is heated by the exterior surfaces thereof being exposed to impinging streams of hot gas and, after the product is finished, the mold is cooled by being subjected to cooling water from water spray nozzles, after which the fused finished article is stripped from the mold. In addition, an endless conveyor moves a plurality of molds through various stations in the performance of the method. Although the method and assembly shown in this patent have proven to be very satisfactory, there are disadvantages such as the open flame adjacent the molds, which produces the hot gas for heating of the molds, and the use of water or liquid for cooling the molds and which can be incompatible with the plastisol. Further, the assembly, because of its long conveyor and multiple molds, is suited for long runs of a plastisol of a particular color but is not well suited for short runs or quick or efficient changeovers.

Other methods of heating in a slush molding process have been utilized in the prior art; for example, the molds may be moved through heating ovens as exemplified in U.S. Pat. No. 3,002,230 granted to J. W. Stewart on Oct. 3, 1961. Alternatively, the molds may be subjected to induction heaters as exemplified in U.S. Pat. No. 3,315,016 granted to John M. Wersosky and Donald A. Moore on Apr. 18, 1967 and assigned to the assignee of the subject invention. Another method for heating the mold is exemplified in U.S. Pat. No. 3,680,629 granted to Laurent R. Gaudreau and Floyd E. McDowell on Aug. 1, 1972 and assigned to the assignee of the subject invention. That patent teaches the heating of a mold by incorporating tubes in the mold and flowing a heated fluid such as steam through the tubes for heating the mold. It is also known in the slush molding art to heat the mold by such tubes for conveying liquid through the mold wherein there are multiple circuits of the tubes with each circuit having an inlet and an outlet, but with each circuit subjected to the same fluid medium, i.e., the same temperature.

One of the problems associated with the prior art methods is that in many articles which are manufactured by slush molding where the mold is filled with plastisol, some areas of the filled mold are at a lower liquid level of the plastisol and are salvage or trim areas which are not used in the final product and therefore do not require the thickness of the other finished areas in the product. Yet, when the entire mold surface is heated uniformly the entire finished article has approximately the same thickness even though some areas are trim or non-usable. There is known in the slush molding art the technique of varying the thickness by heating different areas of the mold to a higher degree to increase the thickness of the article in certain areas. Such a technique is exemplified in U.S. Pat. No. 2,588,571 granted to Sydney Porter on Mar. 11, 1952. That patent discloses the technique of slush molding a boot by utilization of infrared lamp heating and shielding the heating from certain portions of the mold to prevent the build-up of the plastisol thickness and to increase the thickness of the sole of the boot by increased heating.

SUMMARY OF THE INVENTION

The subject invention provides an improved method and assembly for performing the method of controlling the thickness of an article made by the slush molding process in a mold having first and second groups of liquid passages disposed adjacent the mold surface for controlling the temperature over respective first and second areas of the mold surface. The first group of liquid passages are disposed adjacent the first area of the mold surface where it is desired to increase the thickness of the finished article whereas the second group of passages are disposed adjacent the second area of the mold surface where the material in the finished article is scrapped and/or will be trimmed and therefore the desired thickness is desirably less. Both the first and second groups of passages are supplied with liquid to maintain the temperature of the first and second areas of the mold surface at a non-gelling temperature as liquid plastisol is disposed over the mold surface to define a coating or layer. This very thin coating of plastisol is applied to be free of surface blemishes. Thereafter, additional liquid plastisol is provided for increasing the thickness only over the first area of the mold surface. To accomplish this, the first group of passages is supplied with a liquid at a temperature higher than the non-gelling temperature of the liquid in the second group of passages for heating the first area of the mold surface to a higher temperature than the second area so as to gel the liquid plastisol over the first area of the mold surface which is heated with the heat supplied by the liquid in the first group of passages. After the desired gelled thickness is attained, all passages are supplied with liquid at a temperature sufficient to heat the first and second areas of the mold to a cure temperature for curing all of the plastisol. Accordingly, the finished article will have a greater thickness over the first area which defines the finished area of the article whereas the thickness of the article over the second area of the mold surface will be much thinner and define the scrap or trim areas. Consequently, significant amounts of material are saved.

Another aspect of the subject invention is the provision of an assembly for a slush molding which includes a stationary pedestal rotatably supporting a mold support means for rotation about an axis for rotating a mold supported thereby to empty the mold of liquid plastisol and a movable module for supplying liquid plastisol to the mold supported by the mold support means with a dump tank movable therewith and disposed under the mold support means when the module is in the operating position relative to the pedestal for receiving plastisol emptied from the mold. Accordingly, one such module may be utilized for supplying a specific plastisol for a given number of articles made by a mold supported on the pedestal and to change plastisols very rapidly and quickly for continuing the run. It is only necessary to substitute another module having another plastisol as, for instance, a plastisol of a different color.

PRIOR ART STATEMENT

The U.S. Pat. No. 3,728,429 discussed above discloses a slush molding process wherein the mold is heated by being subjected to hot gases and cooled by being subjected to cooling water and wherein the molds move on an endless conveyor through various stations. There is no suggestion in that patent of the subject inventive concept of utilizing first and second groups of passages for differential heating of the mold for controlling the thickness of the article formed therein. Furthermore, there is no suggestion of utilizing a modular system as suggested by the subject invention wherein a particular module may be moved into position relative to the mold for making a first plurality of articles of one color and thereafter another module may be moved in position relative to the mold for making a plurality of the same articles but of a different color. The above-mentioned U.S. Pat. No. 3,680,629 suggests the use of liquid passages adjacent the mold surface for controlling the temperature of the mold, however, there is no suggestion in that patent of using first and second groups of passages and control means for supplying liquids at different temperatures to the first and second groups of passages respectively. Even though there may be known in the prior art molds with two separate groups of passages adjacent the mold surface, there is no suggestion of utilizing control means for supplying liquid at different temperatures in different sequences to the respective groups of passages for differentially heating the mold surface. As alluded to above in regard to U.S. Pat. No. 2,588,571, the technique of varying the thickness by differential heating is known in the slush molding art, however, such is accomplished by infrared heating. There has been no recognition in the prior art of the advantages of differentially heating and cooling the surfaces of the mold used in the slush molding process by utilizing different groups of liquid passages adjacent the mold surface and a control means for sequentially supplying those passages with liquids at different temperatures. Further, there has been no recognition in the prior art of the advantages of utilizing a modular approach to the slush molding process wherein one module may be utilized with a mold for a given run of articles of one color and a second module thereafter utilized with the same mold for making a plurality of articles of a different color.

BRIEF DESCRIPTION OF DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
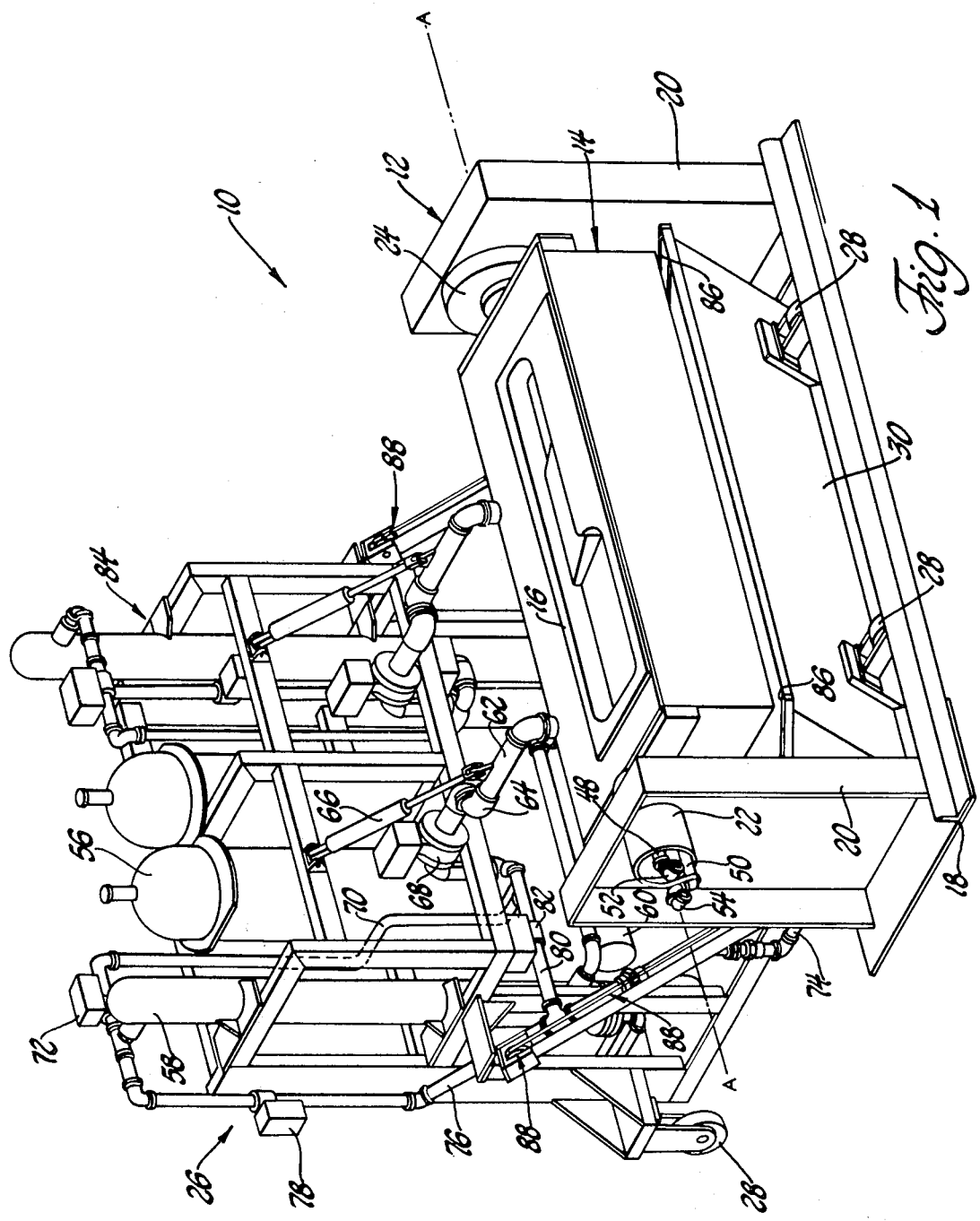
FIG. 1 is a perspective view of a preferred embodiment of an assembly constructed in accordance with the subject invention.
Figure 2:
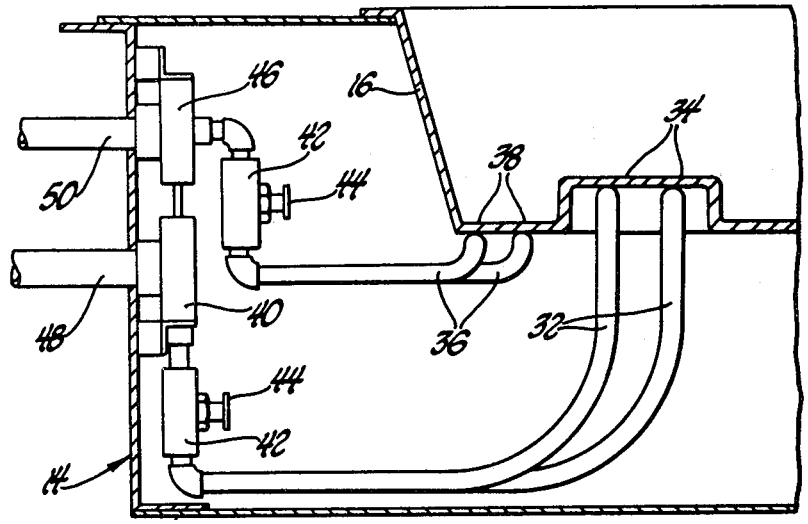
FIG. 2 is a fragmentary cross-sectional view showing a mold supported in a mold support means for utilization with the subject invention.

FIG. 1 shows an assembly generally indicated at 10 and constructed in accordance with the subject invention. The assembly 10 includes a stationary pedestal generally indicated at 12 for rotatably supporting a mold support means generally indicated at 14. The pedestal 12 rotatably supports the mold support means for rotation about the axis A-A. The mold support means 14 is a box or coffin-like structure which receives and supports a mold 16. The mold 16 has a mold cavity defining a mold surface.

The pedestal 12 is stationary and includes a base 18 and spaced support legs 20. The support legs 20 rotatably support the mold support means 14 through large circular bearings (not shown) disposed on collars or sleeves 22, which collars or sleeves 22 have accesses or openings through the center thereof, the purpose of which will be explained hereinafter. The mold support means 14 is rotated through a large chain sprocket disposed within the housing 24 and secured to the sleeve 22. A chain is entrained about the large sprocket and is entrained about a drive sprocket rotated by a motor supported upon the base 18.

The assembly 10 also includes a movable modular unit generally shown at 26 for supplying liquid heat-fusing material such as a plastisol to the open mold 16. The entire unit 26 is supported on a plurality of rollers 28 and includes a dump tank 30. The dump tank 30 is movable with the entire unit 26 and is normally disposed under the mold support means 4 when the unit 26 is in the operating position illustrated in FIG. 1 relative to the pedestal 12 for receiving plastisol emptied from the mold 16 as the mold 16 is rotated for dumping or emptying into the dump tank 30. As alluded to above, the mold 16 may be supplied with a different plastisol or the same plastisol of a different color merely by moving the modular unit 26 away from the mold and inserting or placing a different modular unit in position having a different plastisol. Further, and as will become clear hereinafter, the preferred embodiment of the unit 26 includes two modules for supplying two different plastisols whereby two different plastisols may be sequentially supplied to the mold. This can result in a continuous production cycle utilizing a particular mold 16 to make the same product or article of different colors.

The modular unit 26 is a plastisol supply and retrieval module for suppying liquid plastisol to the mold surface of the mold 16 and for retrieving liquid plastisol emptied or dumped from the mold 16. The rollers 28 define a conveyance means for fascilitating the movement of the unit 26 away from the pedestal 12 and the mold support means 14.

The mold 16 has a molding surface on the interior thereof which must be heated for the plastisol to gel. A first group of liquid passages 32 are disposed adjacent the mold surface over a first area 34 of the mold surface for controlling the temperature over the first area 34 of the mold surface. Additionally, a second group of liquid passages 36 are disposed adjacent the mold surface over a second area 38 of the mold surface for controlling the temperature over the second area 38.

A first manifold means, including a pair of manifolds 40 are supported by the mold support means for distributing liquid to and collecting liquid from the first group of passages 32. More specifically, a manifold 40 is disposed at each end of the mold support means 14 and the respective fluid passages or conduits 32 extend between the two manifolds 40. Each conduit 32 is connected to the manifold through a regulating valve 42 having a manual adjustment 44 whereby the liquid flow in each respective line 32 may be manually adjusted. In a similar fashion, the assembly includes a second manifold means comprising a pair of manifolds 46 disposed at the respective ends of the mold support means 14 for distributing liquid to and collecting liquid from the second group of passages 36. Further, each passage 36 is connected to the manifold 46 through a regulating valve 42 having a manual adjustment 44. It will be appreciated that the regulating valves 42 need only be disposed at one end of the mold support means 14 for regulating the fluid flow through the respective passages 32 and 36.

As used herein, the term first group of liquid passages and/or the term second group of liquid passages may include any number of passages including one singular passage. Further, the terminology that the passages are disposed adjacent the mold surface is intended to cover embodiments where the tubes defining the passages 32 and 36 are welded, braised or otherwise attached to the surfaces of the mold, as illustrated, or partially or completely embedded in the walls of the mold section. Additionally, the groups of passages may be defined other than by the tubes illustrated so long as the passages are defined to supply liquid at different temperatues to differentially heat the areas of the mold and to retrieve the liquid for recirculation, i.e., a closed system for the liquid.

The first supply line 48 is in communication with the manifolds 40 of the first manifold means and a second supply line 50 is in communication with the manifolds 46 of the second manifold means. As alluded to above, the rotatable supports or sleeves for the mold support means 14 on the legs 20 have circular openings therethrough at each end and the lines 48 and 50 extend therethrough, as illustrated in FIG. 1. A first swivel means or joint 52 is associated with each end of the line 48 and is disposed on the axis A-A for allowing the first supply line 48 to rotate with the mold support means 14. In a similar fashion, the lines 50 extend through two 90° elbows to a second set of swivels 54 defining a second swivel means disposed on the axis A-A in axially spaced relationship to the swivels 52 for allowing both ends of the second supply line 50 to rotate with the mold support means 14. As will be appreciated from viewing FIG. 1, the supply line 50 moves about the axis of the supply line 48 and, therefore, the degree of rotation of the mold support means 14 is limited to approximately 270°.

Figure 3:
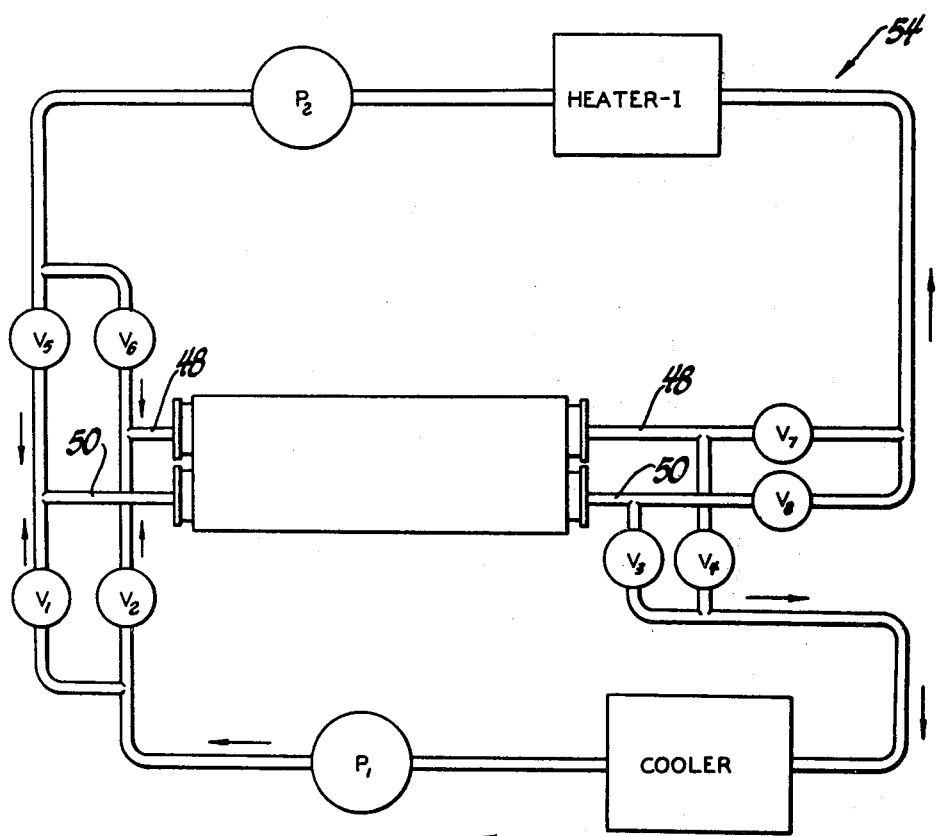
FIG. 3 is a schematic view of the liquid circuits utilized to heat and cool a mold in accordance with the subject invention.

There is also included a control means generally shown at 54 in FIG. 3 for sequentially supplying liquid to the first and second groups of passages 32 and 36 for maintaining the temperature of the first and second areas 34 and 38 of the mold surface at a non-gelling temperature below that required to gel any appreciable thickness of the plastisol over the mold surface and for thereafter heating the first area 34 of the mold surface to a higher temperature than the second area 38 of the mold surface for gelling additional plastisol to a predetermined thickness over the first area 34 of the mold surface. An oil, such as a hydraulic oil, may be utilized in the fluid or liquid passages 32 and 36 as the heat conducting medium. Preferably, the liquid used is made by Dow Chemical under the trademark "DOW-THERM A" and comprises 26.5% diphenyl $[C_6H_5C_6H_5]$ and 73.5% diphenyl oxide $[(C_6H_5)_2O]$. When the mold 16 is first filled with plastisol, the solenoid-actuated control valves $V_1$, $V_2$, $V_3$ and $V_4$ are closed and the valves $V_5$, $V_6$, $V_7$ and $V_8$ are open and oil is circulated through both manifolds 40 and 46 by the pump $P_2$ and the oil is heated by the heater I which is a gas burning heat exchanger. A thermo couple or thermistor is associated with the mold surface of the mold 16 and when the mold surface reaches approximately 150° all of the valves are closed and the mold support means 14 is rotated to dump or empty the mold 16 into the dump tank 30. When the first and second areas 34 and 38 of the mold surface are heated to a range of approximately 130° F. to 150° F. a thin coating is applied over the mold surface. This coating or layer is actually applied as the mold 16 is filled and emptied of plastisol, as some of the liquid plastisol covers the mold surface or flows into the intricacies thereof during the emptying motion. After the mold is emptied, it is returned to the upright position. A limit switch is associated with the mold support means to provide a signal when the mold support means is returned to the upright position illustrated in FIG. 1. When the mold support means returns to the upright position, only the solenoid-actuated valves $V_6$ and $V_7$ are open to supply hot oil through the manifold 40 and to the liquid passages 32 for heating the first areas 34 of the mold surface. The oil is approximately 400° F. and heats the first areas 34 of the mold surface to a range of 250° F. to 260° F. as the mold is refilled or additional plastisol placed in the mold for gelling the plastisol in the first areas 34 of the mold surface. During this period the temperature of the mold surface in the second areas is maintained at a non-gelling temperature. Another thermocouple provides a signal when the mold surface temperature is approximately 250° F. to provide a signal for pouring the additional plastisol into the mold 16. It will be appreciated by those skilled in the art that the temperature of the first areas may be raised for gelling before or during or after the filling of the mold depending upon the design of the mold and other factors. A timer may be provided to provide a predetermined time the plastisol is subjected to the 250° temperature of the mold for providing a predetermined thickness in the article before the mold support means 14 is again rotated for emptying the additional plastisol into the dump tank 30. When the mold support means 14 is rotated back to the upright position, valves $V_5$, $V_6$, $V_7$ and $V_8$ are opened to supply the 450° oil through both liquid passages 32 and 36 so the mold surface temperature in all areas reaches a range of 350° F. to 400° F. for gelling the plastisol over the second areas and curing or fusing the entire finished plastisol article over both the first and second areas. After the curing, the mold support means rotates to a position where the mold faces outwardly or is in a generally perpendicular position and valves $V_5$, $V_6$, $V_7$ and $V_8$ are closed and valves $V_1$, $V_2$, $V_3$ and $V_4$ are opened to supply cool oil through liquid passages 32 and 36 for cooling the mold surface whereby the article may be manually stripped from the mold. This cooling brings the mold temperature down to approximately 150°, a temperature desired for the first filling of the mold in making the next article. The oil flow in the cooling circuit passes through the cooler and pump $P_1$ and is preferably at a temperature of approximately 80° F. An appropriate electrical control circuit actuates the valves and the drive mechanism for rotating the mold support means in the proper sequence. Alternatively, the thermocouples and other controls may provide signals to an operator who may, in turn, manually actuate each successive sequence.

Figure 4:
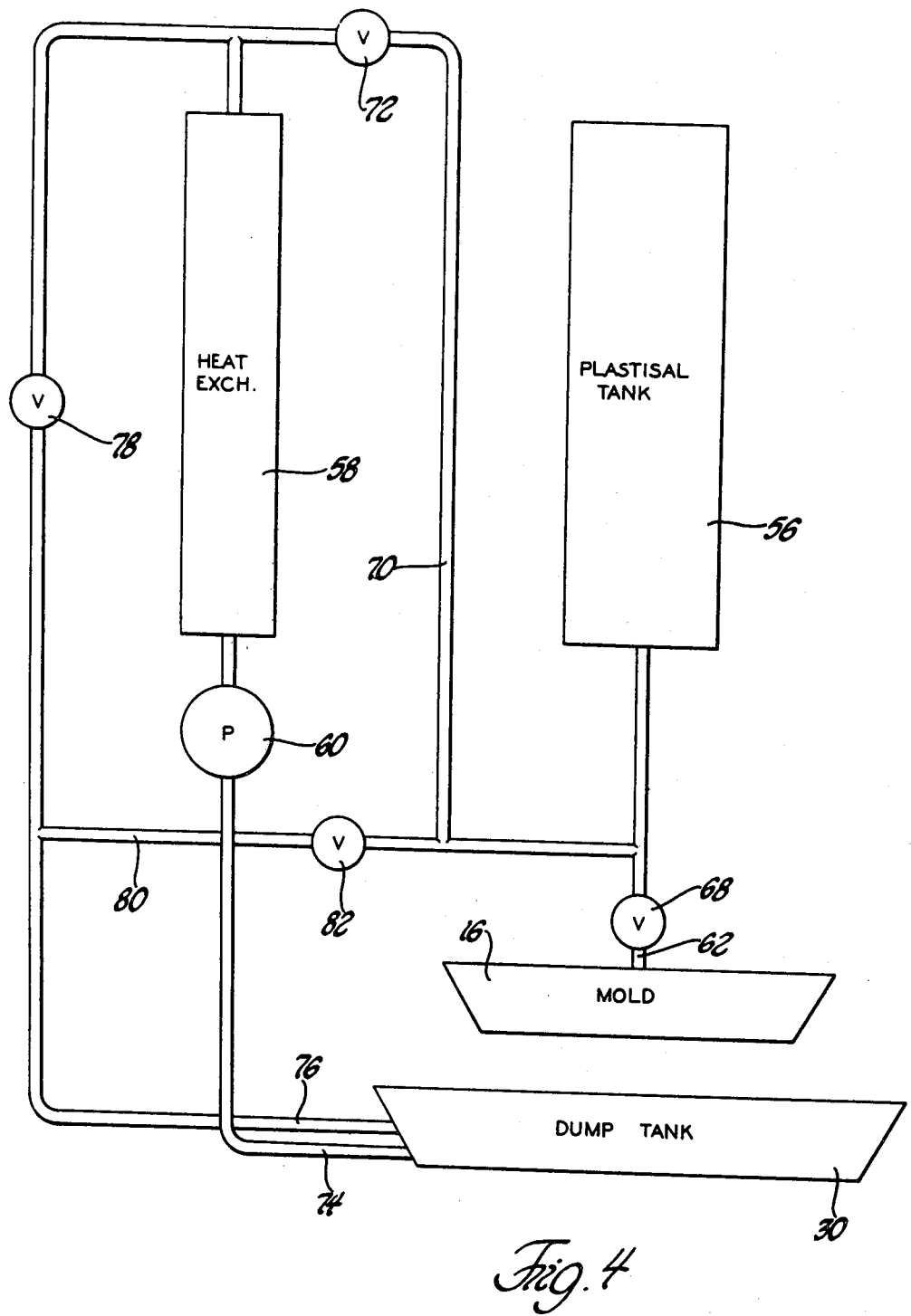
FIG. 4 is a schematic view showing a plastisol supply and retrieval circuit utilized with the subject invention.

The modular unit 26 includes a framed structure of structural beams supported on the rollers 28. As alluded to above, the frame structure supports two complete plastisol supply systems or modules, only one of which will be described in conjunction with FIGS. 1 and 4. The frame structure supports a plastisol storage tank 56 and a plastisol heat exchanger 58. The plastisol heat exchanger 58 has a heating coil passing therethrough through which hot liquid may be passed for heating the plastisol to maintain its proper viscosity.

There is also included a pump 60 for circulating the plastisol through the system.

There is also included a supply conduit means 62 for supplying plastisol to the mold 16. The conduit 62 has a swivel 64 therein so the end of the conduit 62 may be moved upwardly and out of the way by an actuator 66. The flow of plastisol to the mold 16 is controlled by a valve 68. The bottom of the plastisol tank 56 has a conduit leading to the valve 68 and teed off that conduit is a line 70 which extends to a valve 72 adjacent the top of the heat exchanger 58. A drain line 74 leads from the bottom of the dump tank 30 into the pump 60 to the heat exchanger 58. Another conduit 76 extends from the dump tank 30 upwardly to a valve 78 with a conduit 80 connected thereto and to a valve 82. In certain modes of operation the valves 72 and 82 will be closed and the valve 78 will be open whereby liquid plastisol will be circulated from the drain line 74 through the pump 60, heat exchanger 58, the valve 78 and back through the line 76 into the dump tank for circulation and heating thereof. Alternatively, the valve 78 and the valve 82 may be closed whereby liquid plastisol moves from the dump tank through the pump 60, the heat exchanger 58, the valve 72, line 70 and to the plastisol tank 56 or through the valve 68 to be dumped from the conduit 62 into the mold 16. The conduits 74 and 76 define return conduit means for returning the plastisol from the dump tank 30 to the storage tank 56. As explained hereinbefore, when the mold support means 14 is rotated, plastisol in the mold 16 is dumped into the dump tank 30.

The modular unit includes another independent plastisol supply and retrieval means or module with its circuit heating, storing, etc., components, and is generally shown at 84 in FIG. 1. The module or system 84 is identical to the module having the components described immediately above. The advantage of having two independent modules or systems on one modular unit is that two different plastisols may be utilized for the initial layer or coating as distinguished from the subsequent gelling of an additional thickness in the article. Further, with one modular unit, an article of two different plastisols or a plastisol of two different colors may be made in short consecutive runs. Because two different plastisols may be utilized, the top of the dump tank 30 includes channels 86 at either end into which rollers are slidably disposed. The rollers are attached to a cover plate which is actuated by a pulley cable system 88. Another dump tank which is not shown is disposed immediately rearwardly of the dump tank 30 and when a second plastisol is utilized which is incompatible with the plastisol in the tank 30, the plate is moved by the cable pulley system 88 to a position to cover the dump tank 30 so that when the mold is emptied, the plastisol will flow over the cover plate rearwardly and downwardly and into the secondary dump tank disposed rearwardly of the dump tank 30. Additionally, another complete modular unit including one or more modules may be moved into position for making articles of additional different plastisols.

Thus, the control means includes a hot liquid circuit having control valves, a pump $P_2$, a first heat exchange means, comprising the heater I, for sequentially supplying liquid to the first and second supply lines 48 and 50 and a cold liquid circuit having control valves, a pump $P_1$ and a second heat exchange means, comprising the cooler, for sequentially supplying liquid to the first and second supply lines 48 and 50.

OPERATION OF PREFERRED EMBODIMENT

Thus, in accordance with the subject invention, initially all of the passages 32 and 36 are supplied with liquid oil to heat or cool the first and second areas 34 and 38 of the mold surface to maintain a non-gelling temperature and a liquid plastisol is poured into the mold to define a coating or layer. To accomplish this, the mold is filled and emptied into the dump tank 30. As mentioned above, the liquid coating is applied to avoid surface defects in the finished product. Depending upon the mold configuraion it may not always be necessary to perform this liquid coating step. In other words, in some cases it may be possible to first gel the plastisol over the first areas while maintaining the plastisol over the second areas in a non-gelled condition. After the coating is applied, the first group of passages 32 are supplied with a liquid oil at a temperature higher than the temperature of the liquid oil in the second group of passages 36 for heating the first area 34 to a higher temperature than the second area 38. Additional liquid plastisol is disposed over the coating or layer and gelled over the first area 34 of the mold which is heated with the heat supplied by the liquid in the first group of passages 32 to gel a predetermined thickness of the article over the first area 32. The temperature of the liquid in the second group of passages 36 is maintained and arranged to prevent any appreciable gelling of liquid plastisol over the area 38 of the mold heated by the second group of passages 36 to prevent the build-up of gelled plastisol in those areas of the finished article where the additional thickness is not necessarily required and is often wasteful. As mentioned above, the temperature of the first area may be raised to a gelling temperature before or during or after the mold is filled with plastisol. After the mold 16 is emptied the second time when the plastisol has gelled in the first area 34 to the desired thickness, both the first and second groups of passages 32 and 36 are supplied with heated liquid to heat the first and second areas 34 and 38 for gelling the plastisol in the second area and curing and fusing the plastisol over both the first and second areas. Although the steps of the method are distinct, they may be preformed sequentially or simultaneously. In other words, heating and/or cooling of the mold may be accomplished as the plastisol is added or dumped.

As will be appreciated, by preventing the build-up of the thickness of the finished article in the areas of the finished article which may be trimmed or which may not be used, a great deal of plastisol may be reused and recirculated and therefore does not end up in the finished article, thereby providing a significant savings in material costs. Further, because of the method and system employed, the plastisol is not subjected to any open flame heat, as the heat is supplied in a closed circuit and, in a similar fashion, the mold may be cooled by a closed system instead of being subjected to sprayed water, or the like.

An example of an article which may be made in accordance with the subject invention is disclosed in the above-mentioned U.S. Pat. No. 3,315,016 and the information set forth in that patent relative to and in regard to making that article are incorporated herein by this reference.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An assembly for molding an article of heat-fusing material comprising; a mold presenting a mold surface, a first group of liquid passages disposed adjacent the mold surface over a first area thereof for controlling the temperature over said first area of the mold surface, a second group of liquid passages disposed adjacent the mold surface over a second area thereof for controlling the temperature over said second area of the mold surface, and control means for sequentially supplying liquid to said first and second groups of passages, a mold support means supporting said mold, first manifold means supported by said mold support means for distributing liquid to and collecting liquid from said first group of passages, and second manifold means supported by said mold support means for distributing liquid to and collecting liquid from said second group of passages, pedestal means for rotatably supporting said mold support means for rotation about an axis for emptying said mold of liquid heat-fusing material, a first supply line in communication with said first manifold means and a second supply line in communication with said second manifold means, a first swivel means disposed on said axis for allowing said first supply line to rotate with said mold support means and second swivel means disposed on said axis in axially spaced relationship to said first swivel means for allowing said second supply line to rotate with said support means, a heat-fusing material supply and retrieval module for supplying liquid heat-fusing material to said mold surface and for retrieving liquid heat-fusing material emptied from said mold, said module including conveyance means for facilitating movement thereof away from said pedestal means and said mold support means, said module including a dump tank for positioning below said mold support means for receiving and retrieving liquid heat-fusing material emptied from said mold, said module including a frame structure supporting a heat-fusing material storage tank, a heat-fusing material heat exchanger for heating the heat-fusing material, supply conduit means for supplying heat-fusing material to said mold, return conduit means for returning heat-fusing material from said dump tank to said storage tank, pump means for circulating the heat-fusing material, and valve means for controlling the circulation of heat-fusing material through said storage tank, said heat exchanger and said conduit means, said control means including a hot liquid circuit having control valves, a pump and first heat exchange means for sequentially supplying liquid to said first and second supply lines and a cold liquid circuit having control valves, a pump and second heat exchange means for sequentially supplying liquid to said first and second supply lines.

2. An assembly as set forth in claim 1 wherein said module includes at least two independent supply circuits for heating, storing and supplying heat-fusing material to a mold.

* * * * *